United States Patent
Marutani et al.

(10) Patent No.: US 7,324,758 B2
(45) Date of Patent: Jan. 29, 2008

(54) OPTICAL DISPERSION MONITORING APPARATUS AND OPTICAL DISPERSION MONITORING METHOD, AND OPTICAL TRANSMISSION SYSTEM USING SAME

(75) Inventors: Masazumi Marutani, Kawasaki (JP); Takuji Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 530 days.

(21) Appl. No.: 10/716,411

(22) Filed: Nov. 20, 2003

(65) Prior Publication Data
US 2004/0105684 A1 Jun. 3, 2004

(30) Foreign Application Priority Data
Nov. 21, 2002 (JP) .............................. 2002-337435

(51) Int. Cl.
*H04B 10/12* (2006.01)
(52) U.S. Cl. .................. 398/147; 398/158; 398/159; 398/148; 398/149; 398/162; 398/81; 398/29; 398/33; 398/192; 398/202; 398/208; 398/209; 398/213; 398/214; 398/210; 398/177
(58) Field of Classification Search .............. 398/29, 398/33, 81, 147, 148, 159, 149, 177, 158, 398/162, 192, 202, 208, 209, 210, 213, 214
See application file for complete search history.

(56) References Cited

U.S. PATENT DOCUMENTS

| | | | | |
|---|---|---|---|---|
| 5,548,435 A | * | 8/1996 | Tahara et al. ................ | 398/195 |
| 5,717,510 A | * | 2/1998 | Ishikawa et al. ............ | 398/199 |
| 5,973,816 A | * | 10/1999 | Akiyama et al. ............ | 359/237 |
| 5,982,530 A | * | 11/1999 | Akiyama et al. ............ | 359/279 |
| 5,999,289 A | * | 12/1999 | Ihara et al. .................. | 398/147 |
| 6,081,360 A | * | 6/2000 | Ishikawa et al. ............ | 398/147 |
| 6,198,559 B1 | * | 3/2001 | Gehlot ........................ | 398/161 |
| 6,204,949 B1 | * | 3/2001 | Ishikawa et al. ............ | 398/159 |
| 6,262,828 B1 | * | 7/2001 | Akiyama et al. ............ | 359/237 |
| 6,307,988 B1 | * | 10/2001 | Eggleton et al. .............. | 385/37 |
| 6,411,416 B1 | * | 6/2002 | Ooi et al. .................... | 398/141 |
| 6,501,580 B1 | * | 12/2002 | Ishikawa et al. ............ | 398/148 |

(Continued)

FOREIGN PATENT DOCUMENTS

EP 0 912 001 4/1999

(Continued)

OTHER PUBLICATIONS

European Search Report in corresponding Patent Application No. 03026699.3-2415 dated Mar. 17, 2006.

(Continued)

*Primary Examiner*—Hanh Phan
(74) *Attorney, Agent, or Firm*—Staas & Halsey LLP

(57) ABSTRACT

An optical dispersion monitoring apparatus and an optical dispersion monitoring method are capable of monitoring dispersion accurately with a simple construction in an optical transmission system using the same. To this end, the optical dispersion monitoring apparatus includes a light receiving section converting an input optical signal into an electrical signal, a signal transition position detecting section detecting the voltage level of a waveform of the output signal from the light receiving section, at a crossing point of a rising edge and a falling edge, and a cumulative dispersion information extracting section comparing the voltage level at the crossing point with a reference signal to extracts cumulative dispersion information.

11 Claims, 11 Drawing Sheets

U.S. PATENT DOCUMENTS

| | | | |
|---|---|---|---|
| 6,721,509 B2* | 4/2004 | Xiao et al. | 398/83 |
| 6,748,126 B2* | 6/2004 | Koch et al. | 385/11 |
| 6,907,199 B2* | 6/2005 | Koch et al. | 398/81 |
| 6,958,467 B2* | 10/2005 | Inui et al. | 250/227.23 |
| 2002/0015207 A1* | 2/2002 | Ooi et al. | 359/161 |
| 2002/0048062 A1* | 4/2002 | Sakamoto et al. | 359/124 |
| 2002/0089724 A1* | 7/2002 | Nishimoto et al. | 359/161 |
| 2002/0123851 A1* | 9/2002 | Kurooka et al. | 702/69 |
| 2003/0123776 A1* | 7/2003 | Koch et al. | 385/11 |
| 2004/0207902 A1* | 10/2004 | Koch et al. | 359/301 |
| 2004/0208523 A1* | 10/2004 | Carrick et al. | 398/32 |

FOREIGN PATENT DOCUMENTS

| | | |
|---|---|---|
| EP | 0 971 493 | 1/2000 |
| JP | 2001-053420 | 2/2001 |
| JP | 2001-320329 | 11/2001 |
| JP | 2001320329 | 11/2001 |
| JP | 2003-198467 | 7/2003 |

OTHER PUBLICATIONS

Office Action issued in corresponding Japanese Patent Application No. 2002-337435, mailed Aug. 28, 2007.

* cited by examiner

OPTICAL DISPERSION MONITORING APPARATUS AND OPTICAL DISPERSION MONITORING METHOD, AND OPTICAL TRANSMISSION SYSTEM USING SAME

BACKGROUND OF THE INVENTION (1) Field of the Invention

The present invention relates to a technique for monitoring optical dispersion based on waveforms of transmitted light. In particular, the present invention relates to an optical dispersion monitoring apparatus and an optical dispersion monitoring method, capable of monitoring dispersion accurately with a simple construction, and to an optical transmission system using the same.

(2) Description of the Prior Art

In optical communication, as shown at the upper part of FIG. 17 for example, an optical signal sent to a transmission path 101 by an optical transmission apparatus 100 is transmitted for several tens of kilometers to several thousands of kilometers through an optical fiber via optical repeaters 102 using optical amplifiers or signal regenerators, to be received by an optical receiving apparatus 103. At this time, waveform distortion occurs in the optical signal being transmitted, due to nonlinear optical phenomena occurring in the optical fiber depending on a dispersion characteristic of the optical fiber or the intensity of the optical signal, a change in instantaneous optical frequency of a pulse added in the optical transmission apparatus 100, and the like.

To be specific, in the case where a single optical pulse is transmitted through a long distance optical fiber for example, depending on the wavelength of the optical pulse or the characteristic of the optical fiber, "pulse compression" in which the pulse width is narrowed and the peak power is increased, or "pulse spread" in which, conversely, the pulse width is spread and the peak power is reduced, occurs as shown in FIG. 18. Such waveform distortion of optical pulse causes signal interference between adjacent bits in the data transmission, and is therefore a significant problem.

In order to cope with the above described problem, in a conventional optical transmission system, as shown at the lower part of FIG. 17 for example, there is known a structure in which dispersion compensators 104 are inserted in the transmission path at appropriate spacing to compensate for cumulative dispersion, so that a dispersion characteristic of the whole system is in an optimal condition. Furthermore, in an optical transmission system actually operated, since the dispersion characteristic of optical fiber varies over time, sometimes just a single variable dispersion compensator dynamically compensating for variation over time may be used on its own, or in combination with a fixed dispersion compensator performing a large amount of dispersion compensation. The lower part of FIG. 17 shows an example in which a variable dispersion compensator 104A and a fixed variable compensator 104B are connected in series to construct a dispersion compensator 104. In order to operate the variable dispersion compensator 104A to perform the dynamic dispersion compensation as described above, an optical dispersion monitoring apparatus 105 is required for determining whether a compensation amount is optimal or not, while the system is operating.

For a conventional optical dispersion monitoring apparatus, there is for example a structure in which cumulative dispersion is detected by paying attention to the spectral shape or spectral intensity at a specific frequency of a received optical signal. Furthermore, there is also known a structure in which the error rate of a regenerated signal at a required monitoring location is measured to detect cumulative dispersion.

Moreover, in Japanese Unexamined Patent Publication No. 2001-320329, a technique is proposed in which a received optical pulse signal is converted into an electrical pulse signal, and depending on the voltage level obtained by rectifying and smoothing an AC component of the electrical pulse signal, it is detected whether the occurred waveform distortion is the pulse compression or the pulse spread.

However, the following problems arise in the conventional optical dispersion monitoring apparatus as described above. Namely, in the system for paying attention to the spectrum of received optical signal, a significantly high quality device is required, since the spectral intensity at a specific frequency is extremely low, and the spectral intensity is easily influenced by frequency characteristics of optical filters, light receiving elements, monitoring circuits, and the like. Consequently, there is a problem in that it is difficult to easily realize an optical dispersion monitoring apparatus.

Furthermore, in the system for measuring the error rate, there is a drawback in that even if it is possible to detect the existence of cumulative dispersion based on the measured error rate to detect an absolute value of cumulative dispersion, the sign of the cumulative dispersion cannot be extracted. In addition, since a signal regenerator is required to measure the error rate, there is a problem in that the locations where an optical dispersion monitoring apparatus can be installed are limited.

Moreover, in the technique proposed in Japanese Unexamined Patent Publication No. 2001-320329, since the construction is such that the occurrence of waveform distortion is detected depending on the temporal average power of a mark component of a received optical signal, it is possible to detect whether the waveform distortion is the pulse compression or pulse spread, however, there is a problem in that it is difficult to detect the cumulative dispersion including sign information with high accuracy.

SUMMARY OF THE INVENTION

The present invention has been accomplished in view of the above described problems, with an object of providing an apparatus and a method for monitoring optical dispersion, capable of monitoring dispersion accurately with a simple construction, and an optical transmission system using the same.

In order to achieve the above object, an optical dispersion monitoring apparatus of the present invention, for monitoring dispersion based on a waveform of an input optical signal, comprises: a characteristic amount detecting section selectively detecting a physical amount corresponding to a location where waveform distortion occurring depending on dispersion appears distinctively in the waveform of the input optical signal; and a dispersion information extracting section extracting information related to the dispersion occurred in the optical signal, based on a comparison between the physical amount detected in the characteristic amount detecting section and a reference value indicated by a reference signal, to output the information.

In such an optical dispersion monitoring apparatus, an input optical signal is supplied to the characteristic amount detecting section, the physical amount corresponding to the location where the waveform distortion occurring depending on dispersion appears distinctively in the signal waveform is detected selectively, and the detection result is transmitted to the dispersion information extracting section. In the dispersion information extracting section, the physical amount detected in the characteristic amount detecting section is compared with the reference value indicated in the reference signal, and information related to the dispersion occurred in the optical signal is extracted based on the comparison result. Thus, it becomes possible to monitor with high accuracy the dispersion including sign information with a simple construction, compared to a conventional monitoring system.

As one aspect of the above described optical dispersion monitoring apparatus, the construction may be such that the characteristic amount detecting section includes: a light receiving section converting the input optical signal into an electrical signal; and a signal transition position detecting section detecting the voltage level corresponding to at least one of a rising edge and a falling edge of waveform of the electrical signal converted in the light receiving section, and the dispersion information extracting section compares the reference value indicated by the reference signal with the voltage level detected in the signal transition position detecting section, and outputs a signal corresponding to the comparison result as dispersion information. In such a construction, the voltage level corresponding to the rising edge or the falling edge of the waveform of the electrical signal converted in the light receiving section is detected as the physical amount corresponding to the location where the waveform distortion appears distinctively, and the dispersion information is extracted based on the comparison of the voltage level and the reference value.

Furthermore, as another aspect of the above described optical dispersion monitoring apparatus, the construction may be such that the characteristic amount detecting section includes: a light receiving section converting the input optical signal into an electrical signal; and a signal intensity detecting section detecting the average intensity of waveform of the electrical signal converted in the light receiving section, by sampling parts of the waveform at the center of one cycle and locations neighboring the center in accordance with a clock signal synchronized with the input optical signal, and the dispersion information extracting section compares the average intensity detected in the signal intensity detecting section with the reference value indicated by the reference signal, and outputs a signal corresponding to the comparison result as dispersion information. In such a construction, the average intensity of waveform of the electrical signal converted in the light receiving section, at the center of one cycle and the locations neighboring the center, is detected as a physical amount corresponding to the location where the waveform distortion appears distinctively, and dispersion information is extracted based on the comparison of the average intensity and the reference value.

Moreover, an optical dispersion monitoring method of the present invention, for monitoring dispersion based on a waveform of an input optical signal, comprises: selectively detecting a physical amount corresponding to a location where waveform distortion occurring depending on dispersion appears distinctively in the waveform of the input optical signal; and extracting information related to the dispersion occurred in the optical signal, based on a comparison between the detected physical amount detected and a reference value indicated by a reference signal.

Furthermore, an optical transmission system of the present invention provided with a variable dispersion compensator on a transmission path through which an optical signal is propagated, for controlling a compensation amount of the variable dispersion compensator to dynamically compensate for dispersion, is constructed so that using the optical dispersion monitoring apparatus of the present invention, dispersion occurred in the optical signal being propagated through the transmission path is monitored and the compensation amount of the variable dispersion compensator is controlled in accordance with the monitored result. In this manner, if the variable dispersion compensator is controlled using the optical dispersion monitoring apparatus of the present invention, it is possible to perform dynamic compensation for dispersion occurred in the optical transmission system easily and reliably.

Other objects, features, and advantages of this invention will become apparent from the following description of embodiments, in association with the appended drawings.

DETAILED DESCRIPTION OF THE INVENTION

Hereunder is a description of embodiments of the present invention based on the appended drawings. Here, identical numerical numbers show identical or equivalent components throughout the figures.

Figure 1:
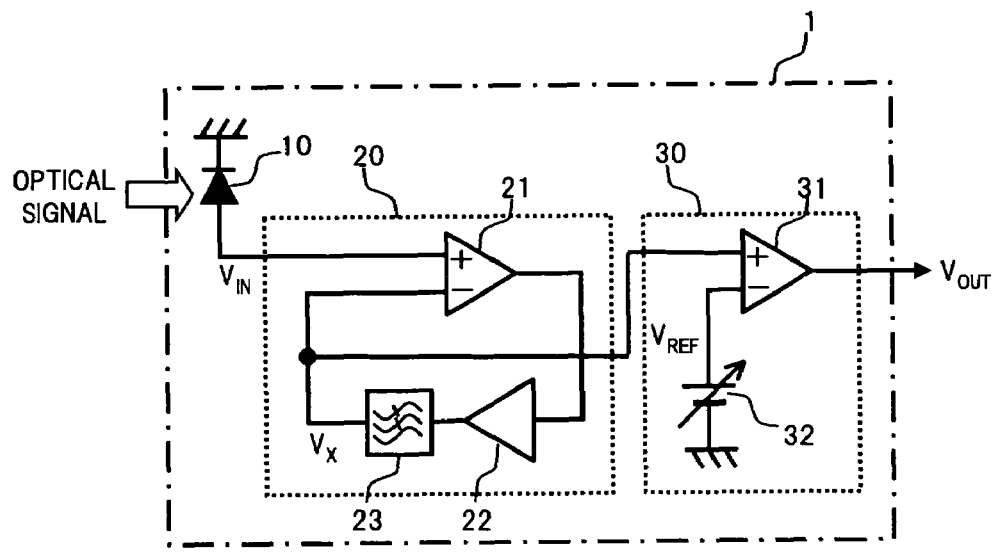
FIG. 1 is a block diagram showing a structure of an optical dispersion monitoring apparatus according to a first embodiment of the present invention.
Figure 2:
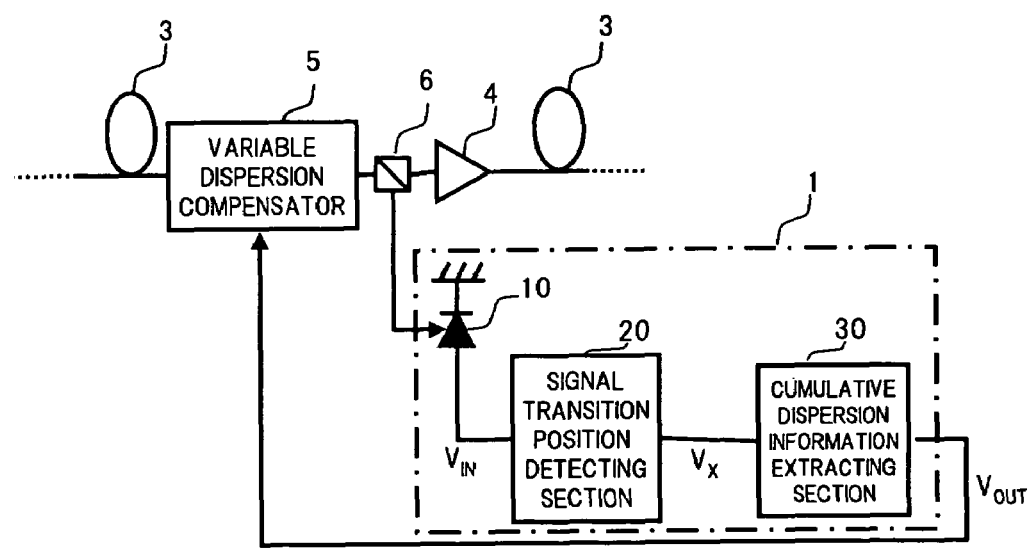
FIG. 2 is a block diagram showing an example of a main structure of an optical transmission system in which dynamic dispersion compensation is performed using the optical dispersion monitoring apparatus of FIG. 1.

FIG. 1 is a block diagram showing a structure of an optical dispersion monitoring apparatus according to a first embodiment of the present invention. FIG. 2 is a block diagram showing an example of a main structure of an optical transmission system in which dynamic dispersion compensation is performed using the optical dispersion monitoring apparatus of FIG. 1.

In the figures, an optical dispersion monitoring apparatus 1 of the present embodiment is provided with, for example, a light receiving section 10 converting an optical signal input thereto into an electrical signal to output it, a signal transition position detecting section 20 detecting the voltage level corresponding to at least one of the rising edge and falling edge of an input light waveform based on the output signal from the light receiving section 10, and a cumulative dispersion information extracting section 30 extracting information related to cumulative dispersion occurred in the input light, based on the detection result in the signal transition position detecting section 20.

The light receiving section 10 converts, for example, an optical signal input to the optical dispersion monitoring apparatus 1 into a current signal using a known light receiving element, and converts the current signal into a voltage signal $V_{IN}$, to output it to the signal transition position detecting section 20. The voltage signal $V_{IN}$ output from this light receiving section 10 is a signal whose level is changed depending on the power of the input light.

Note, the optical signal input to the optical dispersion monitoring apparatus 1 is an optical signal that has a crossing point in an eye pattern drawn by folding back a time waveform of the optical signal in one cycle, that is, an optical signal applied with a code type in which the signal level has no transition during one bit cycle. A representative example of such an optical signal is an optical signal of NRZ type. However, optical signals capable of being input to the optical dispersion monitoring apparatus 1 are not limited to NRZ type.

The signal transition position detecting section 20 includes a comparator 21, a slice amplifier 22 and a low-pass filter 23. The comparator 21 receives a voltage signal $V_{IN}$ output from the light receiving section 10 at one input terminal thereof and a feedback signal $V_X$ transmitted through the low-pass filter 23 at the other input terminal, and compares the level of the voltage signal $V_{IN}$ with the level of the feedback signal $V_X$, to output a voltage signal corresponding to the comparison result to the slice amplifier 22. A typical analog comparator may be used for this comparator 21. The slice amplifier 22 is a typical high gain amplifier which amplifies the voltage level of the output signal from the comparator 21 until it reaches the required high level or low level (here "1" or "0" level). The low-pass filter 23 smoothes the voltage signal amplified in the slice amplifier 22 in accordance with a preset time constant. The voltage signal $V_X$, which is transmitted through this low-pass filter 23 to be averaged, is fed back to the other input terminal of the comparator 21, and also sent to the cumulative dispersion information extracting section 30.

The cumulative dispersion information extracting section 30 includes a comparator 31 and a reference signal generating circuit 32, as shown in FIG. 1 for example. The comparator 31 receives the voltage signal $V_X$ output from the signal transition position detecting section 20 at one input terminal thereof and a reference signal $V_{REF}$ generated in the reference signal generating circuit 32 at the other input terminal, and compares the level of the voltage signal $V_X$ with the level of the reference signal $V_{REF}$, to output a voltage signal $V_{OUT}$ corresponding to the comparison result to outside the optical dispersion monitoring apparatus 1. Cumulative dispersion here means wavelength dispersion accumulated in an input light. The voltage signal $V_{OUT}$ output from the comparator 31 is supplied to a variable dispersion compensator 5 as shown in FIG. 2, for example, to be used for a dynamic control of a compensation amount and the like. Here, the reference signal generating circuit 32 applies, for example, an output voltage generated in a variable power source to the other input terminal of the comparator 31 as a reference signal $V_{REF}$. This variable power source output voltage is set in advance depending on a mark ratio of an optical signal input to the optical dispersion monitoring apparatus 1, as described later.

Figure 17:
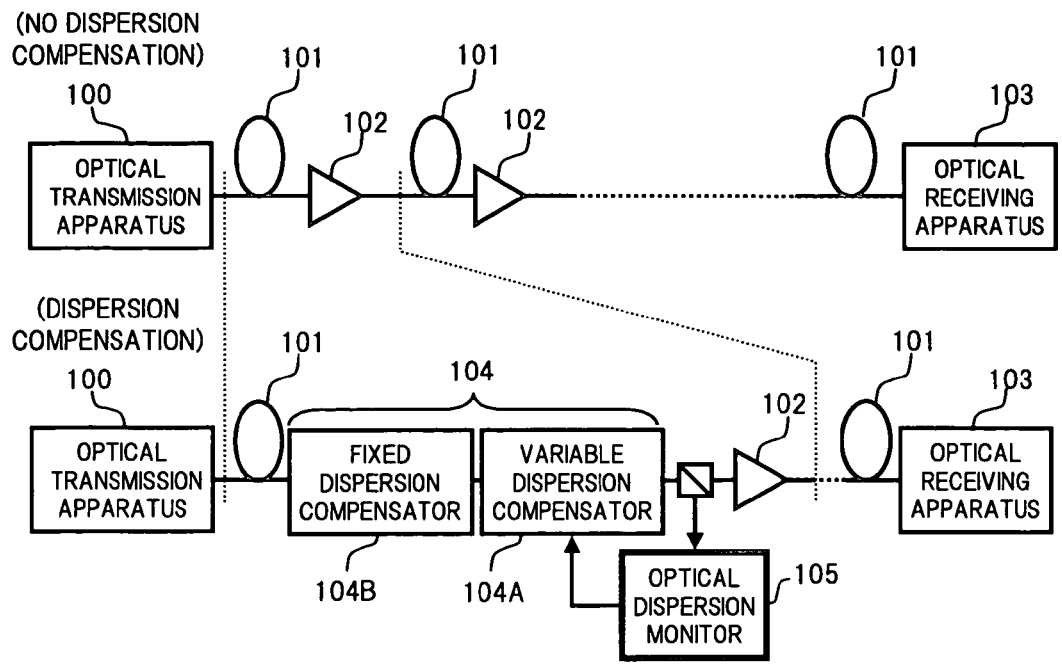
FIG. 17 shows a structural example of a conventional optical transmission system.
Figure 18:
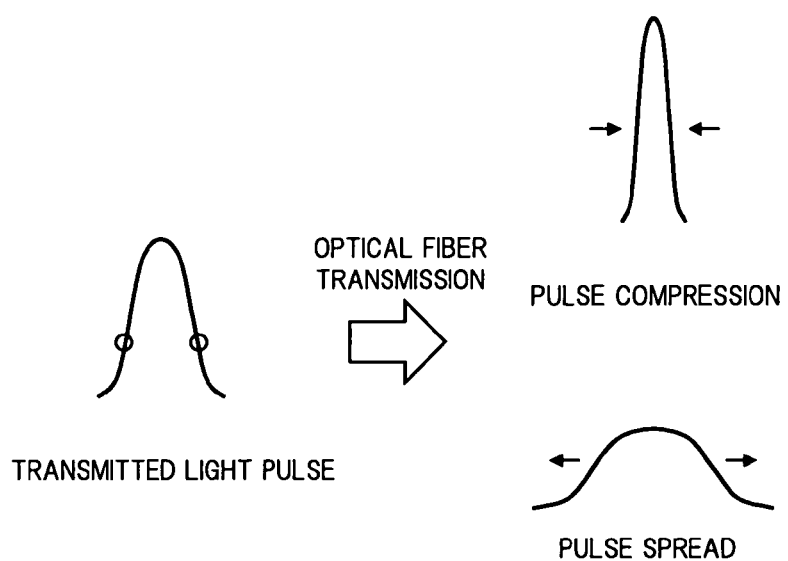
FIG. 18 is a diagram for explaining waveform distortion occurs when a single optical pulse is transmitted through an optical fiber.

Reference numeral 4 in FIG. 2 denotes an optical amplifier for amplifying an optical signal for repeating transmission. Furthermore, reference numeral 6 denotes an optical coupler for branching a part of the optical signal output from the variable dispersion compensator 5 as a monitoring light and supplying it to the optical dispersion monitoring apparatus 1. Here, the construction is such that the optical coupler 6 is disposed between the variable dispersion compensator 5 and the optical amplifier 4 to monitor cumulative dispersion. However, on a transmission path 3, the position where the monitoring light is branched is not limited to the above. Moreover, in the above, there is shown the constitutional example in which cumulative dispersion is compensated using only the variable dispersion compensator 5. However, it is also possible to apply the optical dispersion monitoring apparatus 1 of the present embodiment to the structure in which the fixed dispersion compensator and the variable dispersion compensator are combined as shown at the lower part of FIG. 17 described above.

Next is a description of an operation of the optical dispersion monitoring apparatus 1 in the first embodiment.

Firstly, a change in optical waveform crossing point relative to cumulative dispersion will be described in detail.

In general, if an optical pulse is propagated through a transmission path using an optical fiber or the like, there is a difference in propagation speed between the rising edge and falling edge of the optical pulse depending on its optical wavelength and a dispersion characteristic of the optical fiber. As a result, in the case where the rising edge is delayed and the falling edge is advanced, the pulse is compressed, and conversely, in the case where the rising edge is advanced and the falling edge is delayed, the pulse is spread. When such pulse compression or pulse spread occurs, since the power of the optical pulse is kept, the peak power is increased when the pulse is compressed, while the peak power being decreased when the pulse is spread.

Figure 3:
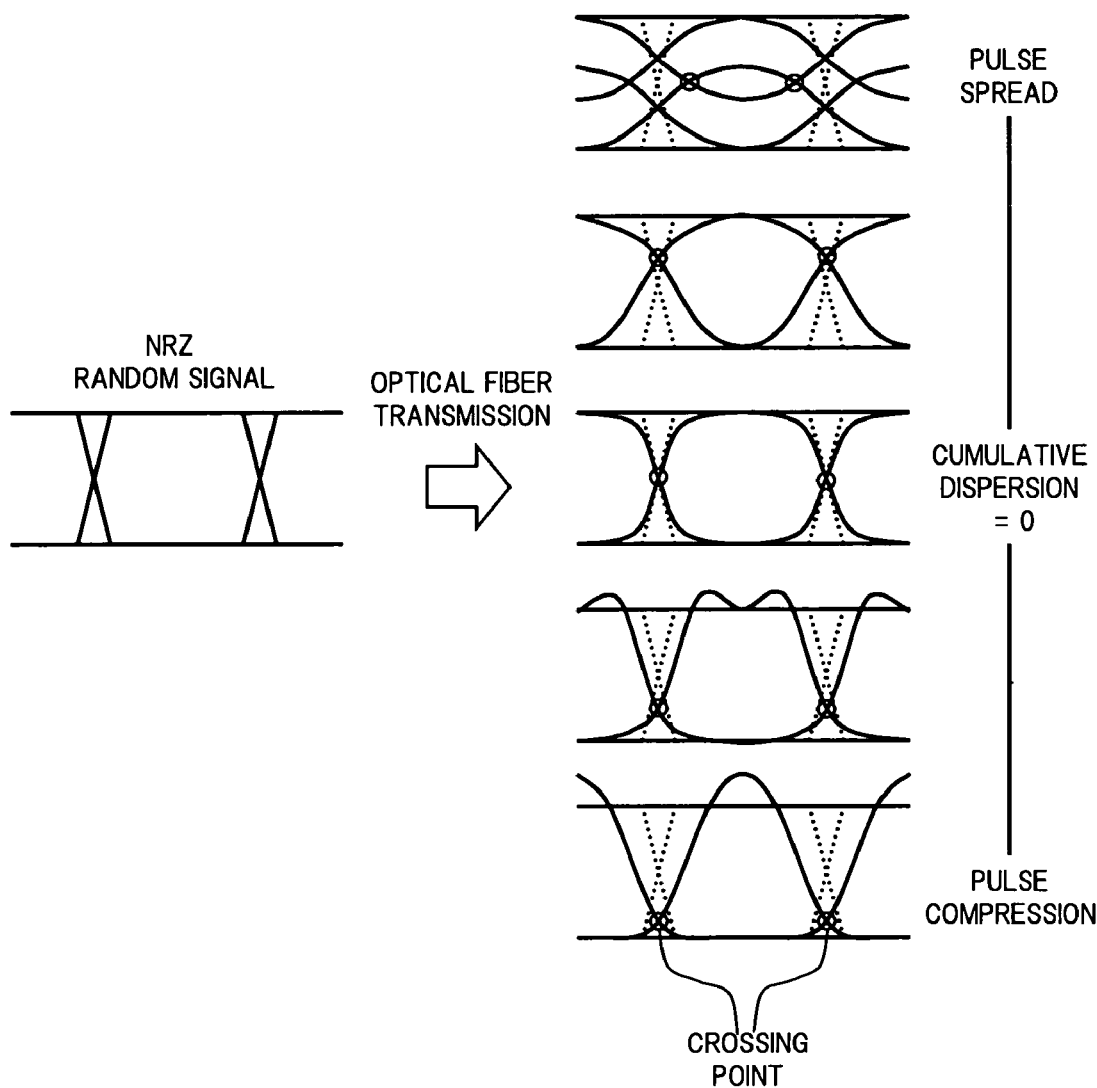
FIG. 3 is a diagram for explaining a change in the optical waveform crossing point relative to cumulative dispersion.

The effect as described above is considered to occur only at transition points when an optical signal is switched between the levels of "1" and "0" in the case of an NRZ optical signal. Accordingly, when an optical signal modulated in a random signal of NRZ type as shown in the eye pattern at the left of FIG. 3 for example, is propagated through an optical fiber, waveform distortion as shown in the eye patterns at the right of FIG. 3 occurs depending on an amount of cumulative dispersion.

When such waveform distortion is compared with each other in paying attention to the crossing points (circled in the figure), it can be seen that positions of crossing points (voltage levels) are changed depending on the state of waveform distortion. To be specific, in a state in which waveform distortion does not occur (cumulative dispersion=0), as shown at the middle right of FIG. 3, the crossing points are positioned centrally between the high level and low level, in a state in which the pulse spread occurs, as shown at the upper right of FIG. 3, the crossing points are positioned on the high level side, and in a state in which the pulse compression occurs, as shown at the lower right of FIG. 3, the crossing points are positioned on the low level side.

In utilizing this relationship between the voltage level of the crossing points and the state of waveform distortion, in other words, the relationship between the change in optical waveform over time and the cumulative dispersion occurring in the optical signal, the optical dispersion monitoring apparatus 1 of the present embodiment enables cumulative dispersion, including up to positive or negative sign information, to be detected with a simple construction.

To be specific, the operation of the present optical dispersion monitoring apparatus 1 will be described in detail with reference to FIG. 4. Firstly, the optical signal branched in the optical coupler 6 disposed on the transmission path 3 is sent to the light receiving section 10 to be converted into the voltage signal $V_{IN}$, and supplied to the signal transition position detecting section 20. In the waveform of the voltage signal $V_{IN}$ input to the signal transition position detecting section 20, distortion occurs depending on cumulative dispersion as shown in (A) of FIG. 4 for example. In addition, the waveform shown on the left side in (A) of FIG. 4 is one example of when the pulse is compressed, the waveform in the center is one example of when no distortion occurs (cumulative dispersion=0), and the waveform on the right side is one example of when the pulse is spread.

Figure 5:
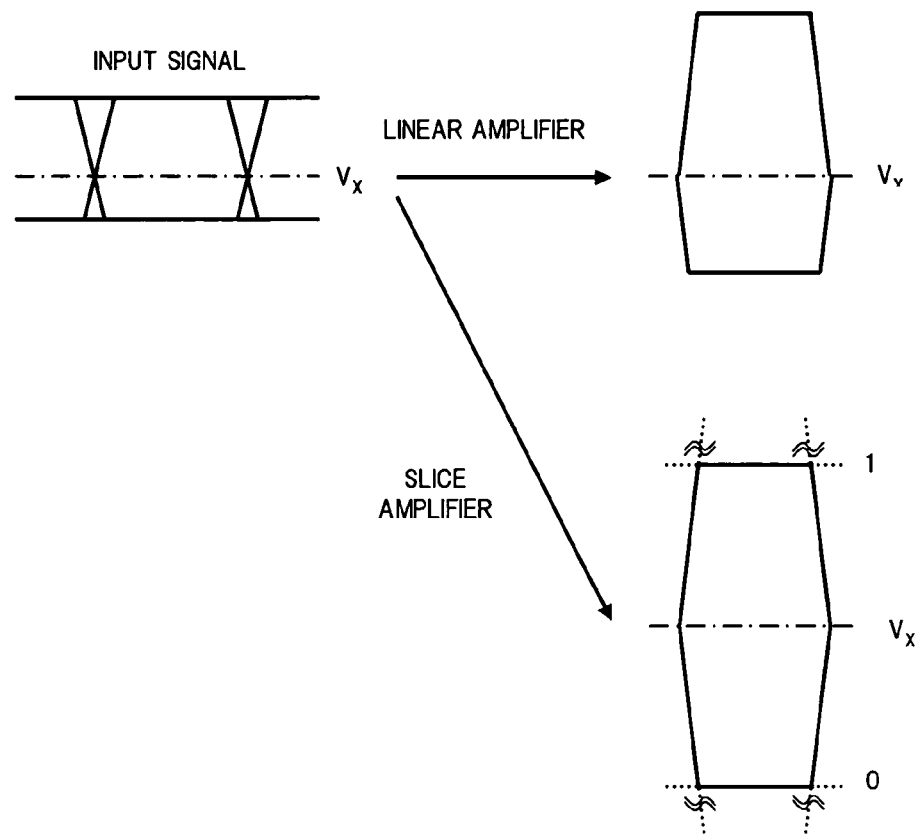
FIG. 5 is a diagram for explaining an amplifying operation of a slice amplifier.

In the signal transition position detecting section 20, the comparator 21 compares the voltage signal $V_{IN}$ output from the light receiving section 10 with the voltage signal $V_X$ fed back through the low-pass filter 23, to output a voltage signal corresponding to the comparison result to the slice amplifier 22. Note, in an initial state, the voltage signal $V_X$ from the low-pass filter 23 is set to the ground level or the like for example. In the slice amplifier 22, the voltage signal output from the comparator 21 is amplified to the required level. The amplification operation in this slice amplifier 22 differs from an amplification operation in a linear amplifier as shown in a conceptual diagram of FIG. 5 for example, and the input signal thereto is amplified until it reaches the "1" or "0" level. The voltage signal amplified in the slice amplifier 22 is sent to the low-pass filter 23, smoothed (averaged) in accordance with a required time constant, and the voltage signal $V_X$ transmitted through the low-pass filter 23 is fed back to the comparator 21.

Figure 4:
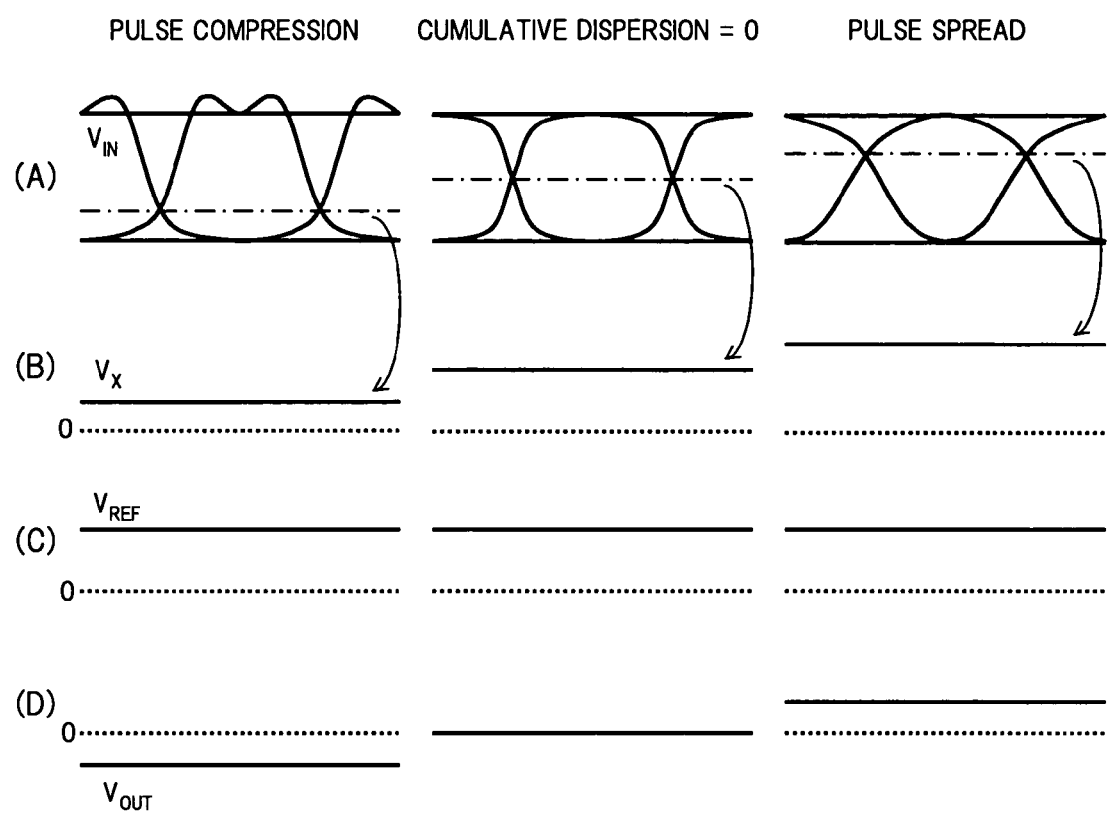
FIG. 4 is a diagram for explaining an operation in the first embodiment.

As described above, the output signal of the comparator 21 is fed back to the comparator 21 via the slice amplifier 22 and the low-pass filter 23, so that the voltage level of the feedback signal becomes stable following the voltage level at the crossing points of the signal $V_{IN}$ input to the signal transition position detecting section 20 as shown in (B) of FIG. 4. As a result, in branching the voltage signal $V_X$ fed back from the low-pass filter 23 to the comparator 21, a change in the rising edge or the falling edge of the input pulse over time is detected as a change in the voltage level at the crossing points. This voltage signal $V_X$ corresponding to the voltage level at the crossing points is sent to the cumulative dispersion information extracting section 30 as an output of the signal transition position detecting section 20.

In the cumulative dispersion information extracting section 30, the comparator 31 compares the voltage signal $V_X$ output from the signal transition position detecting section 20 with the reference signal $V_{REF}$ output from the reference signal generating circuit 32, to output a voltage signal $V_{OUT}$ corresponding to the comparison result as cumulative dispersion information. To be specific, the reference signal $V_{REF}$ supplied to the comparator 31 is set in advance with the fixed voltage level depending on the mark ratio of the optical signal input to the optical dispersion monitoring apparatus 1 as shown in (C) of FIG. 4. Here, the fixed voltage level is set to approximately match the voltage level at the crossing points when the cumulative dispersion is 0. The fixed reference signal $V_{REF}$ set in this manner is supplied to the comparator 31, so that the voltage level of the voltage signal $V_{OUT}$ output from the comparator 31 corresponds to the cumulative dispersion as shown in (D) of FIG. 4. To be specific, in the example of (D) of FIG. 4, a negative value voltage signal $V_{OUT}$ is output as the cumulative dispersion information when the pulse is compressed, while a positive value voltage signal $V_{OUT}$ being output as the cumulative dispersion information when the pulse is spread.

The relationship between the state of waveform distortion and the sign of the cumulative dispersion is that in the case where a chirp characteristic of a modulator on a transmission side of the optical transmission system is positive for example, the cumulative dispersion is negative when the pulse is compressed, while the cumulative dispersion being positive when the pulse is spread. Furthermore, in the case where the chirp characteristic is negative for example, the cumulative dispersion is positive when the pulse is compressed, while the cumulative dispersion being negative when the pulse is spread. Accordingly, in making the chirp characteristics of the system to correspond to the value of the above described voltage signal $V_{OUT}$, it is possible to determine the cumulative dispersion including the sign information.

According to the optical dispersion monitoring apparatus 1 of the first embodiment as described above, the signal transition position detecting section 20 detects the voltage level at the crossing points of the optical signal to which a code type represented in NRZ type is applied, and the cumulative dispersion information extracting section 30 extracts the cumulative dispersion information based on the detection result. Thus, it is possible to detect the cumulative dispersion including up to the sign information with high accuracy using the simpler structure than the conventional monitoring system having paid attention to spectrum intensity. Furthermore, the present optical dispersion monitoring apparatus 1 does not require a signal regenerator as in the conventional system in which an error rate is measured. Hence, it is possible to reduce restrictions to the installation location in the optical transmission system. If the variable dispersion compensator 5 disposed in the optical transmission system is feedback controlled using such an optical dispersion monitoring apparatus 1, it is possible to perform easily and reliably dynamic compensation for cumulative dispersion occurring in the system.

In the first embodiment, the wavelength dispersion accumulated in the input light has been considered as the cumulative dispersion. However, the present invention is not limited thereto. The present invention may be applied to other optical dispersion, such as polarization dispersion and the like, as in the case of the wavelength dispersion, if a relationship with the occurring state of waveform distortion can be specified.

Next is a description of an optical dispersion monitoring apparatus according to a second embodiment of the present invention.

Figure 6:
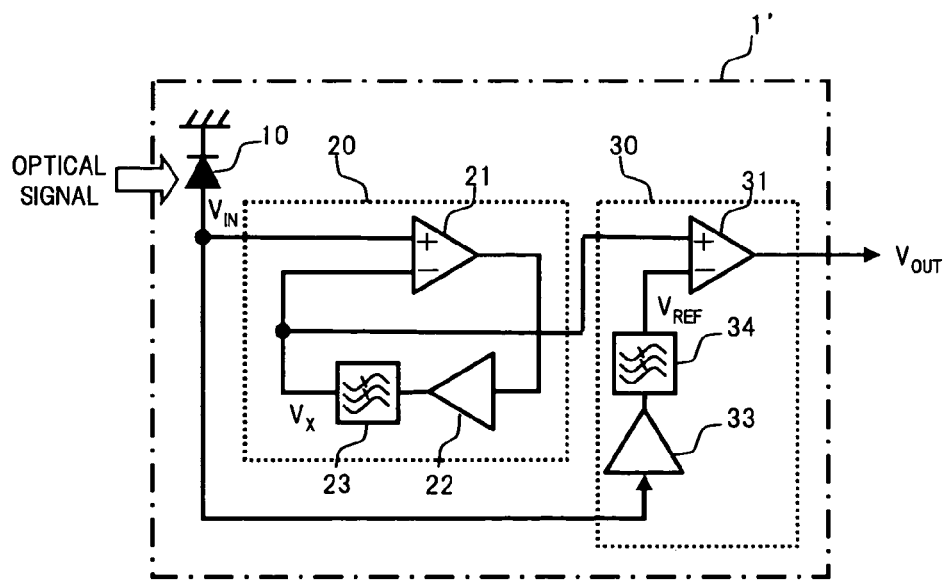
FIG. 6 is a block diagram showing a structure of an optical dispersion monitoring apparatus according to a second embodiment of the present invention.

FIG. 6 is a block diagram showing a structure of the optical dispersion monitoring apparatus of the second embodiment.

In FIG. 6, the structure of the present optical dispersion monitoring apparatus 1' differs from that of the first embodiment shown in FIG. 1 in that a gain control amplifier 33 and a low-pass filter 34 are disposed instead of the variable power source that has been used as the reference signal generating circuit 32, in the cumulative dispersion information extracting section 30. Components other than the above are the same as those in the first embodiment, and hence the descriptions thereof are omitted here.

The gain control amplifier 33 receives the voltage signal $V_{IN}$ output from the light receiving section 10 at an input terminal thereof, and amplifies the input signal to the required level, to output it to the low-pass filter 34. The low-pass filter 34 averages the voltage signal amplified in the gain control amplifier 33 in accordance with a preset time constant. The voltage signal transmitted through the low-pass filter 34 is supplied to the comparator 31 as the reference signal $V_{REF}$.

Here, the gain control amplifier 33 is disposed in a former stage of the low-pass filter 34, but may be disposed in a latter stage of the low-pass filter 34. Furthermore, if the voltage signal $V_{IN}$ output from the light receiving section 10 is of the sufficient level, the gain control amplifier 33 may be omitted.

In the optical dispersion monitoring apparatus 1' with the above construction, the reference signal $V_{REF}$, which is a reference for when the cumulative dispersion information is extracted in the cumulative dispersion information extracting section 30 based on the voltage level at the crossing points detected in the signal transition position detecting section 20, is set following a change in the optical signal input to the optical dispersion monitoring apparatus 1'.

To be specific, the voltage signal $V_{IN}$ converted photoelectrically in the light receiving section 10 is gain controlled by the gain control amplifier 33, and then transmitted through the low-pass filter 34 to be averaged. As a result, the reference signal $V_{REF}$ following the change in the input signal is generated. At this time, even if the waveform distortion occurs corresponding to the cumulative dispersion in the optical signal input to the optical dispersion monitoring apparatus 1', since the optical signal power is stored irrespectively of the waveform distortion, the voltage level of the reference signal $V_{REF}$ averaged by the low-pass filter 34 is constant independently of the occurring state of cumulative dispersion. As a result, the reference signal $V_{REF}$ generated in the above manner can be used as the reference for when the cumulative dispersion is determined based on the voltage level at the crossing points. On the other hand, in the case where the power setting of optical signal input to the optical dispersion monitoring apparatus 1' is changed due to a change in operating conditions of the system, the voltage level of the reference signal $V_{REF}$ is changed following the change in the power setting. As a result, in the case where the fixed reference signal $V_{REF}$ is used as in the first embodiment, it is necessary to reset the reference signal $V_{REF}$ according to the change in operating conditions. However, by using the reference signal $V_{REF}$ that follows the change in the input signal as in the present embodiment, it is possible to realize the automatic setting to the optimum level.

In the case where the cumulative dispersion is determined using the reference signal $V_{REF}$ that follows the change in the input signal as described above, it is desirable to pay attention to a change in the mark ratio of the input optical signal. The following is a description of this using a specific example.

In general, not only in optical communications but also in most data communications, by using a data signal in compliance with a format based on a standard set in advance, interconnection is possible between a plurality of systems. For example, an international standard of 10 Gbit/s in the optical communication field corresponds to "ITU-T G.707". According to the standard above, the mark ratio of most (about 99.999950/%) of data is 1/2. However, strictly speaking, there is a part called "header" for frame synchronization normally or STM identification in the rest (about 0.00005%) of the data. In this "header" part, the mark ratio is defined to be 3/4 or 1/4, and its average power is changed in proportion to the mark ratio.

Accordingly, since the level of the voltage signal output from the low-pass filter 34 in the cumulative dispersion information extracting section 30 is changed depending on the mark ratio due to the input of the header part, there is a possibility that an error occurs in the determination of cumulative dispersion in the cumulative dispersion information extracting section 30. In order to prevent such an error due to a change in the mark ratio, it is effective to have an influence of level change due to the input of the header part masked with the level of when other data part is input, by increasing the time constant of the low-pass filter 34 for example.

According to the optical dispersion monitoring apparatus 1' of the second embodiment as described above, the voltage signal $V_{IN}$ output from the light receiving section 10 is averaged using the gain control amplifier 33 and the low-pass filter 34, and the reference signal $V_{REF}$ that follows the change in the input signal is supplied to the comparator 31. Thus, even in the case where the transmitted optical power is changed due to the change in operating conditions of the system, it is possible to set the reference signal $V_{REF}$ to the optimal level automatically following the change in the transmitted optical power. Therefore, it is possible to monitor the cumulative dispersion stably. Furthermore, if the time constant of the low-pass filter 34 is set considering the change in the mark ratio of the optical signal, it is possible to monitor the cumulative dispersion more reliably.

Next is a description of an optical dispersion monitoring apparatus according to a third embodiment of the present invention.

Figure 7:
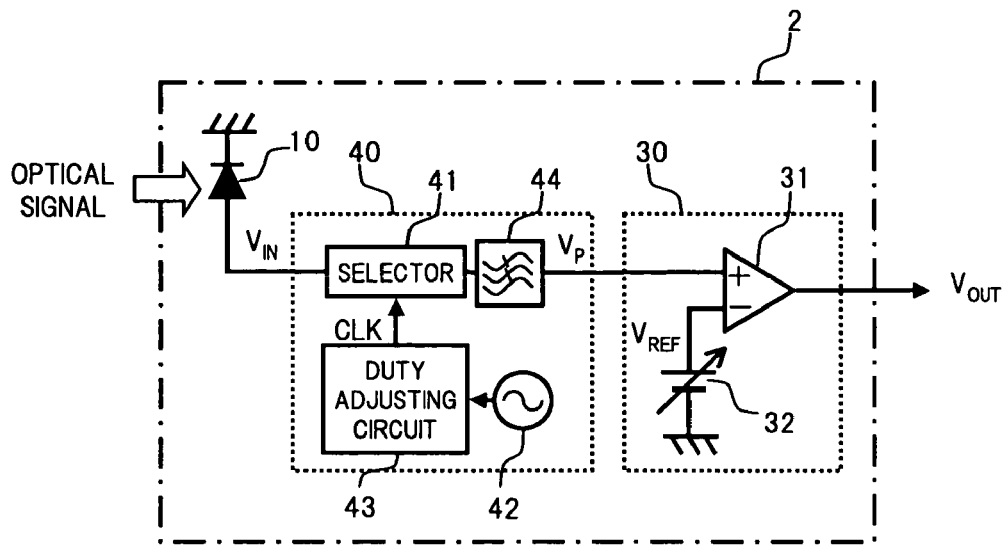
FIG. 7 is a block diagram showing a structure of an optical dispersion monitoring apparatus according to a third embodiment of the present invention.
Figure 8:
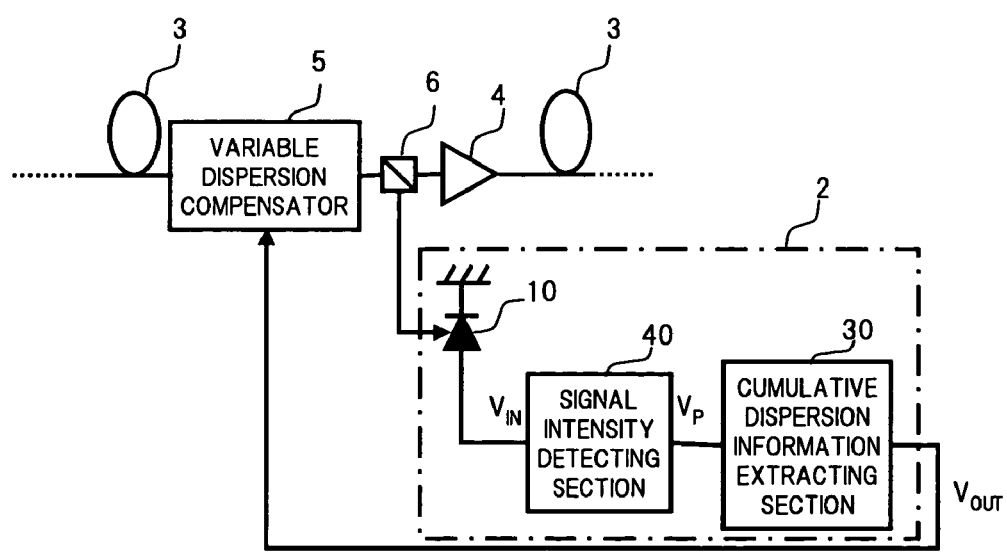
FIG. 8 is a diagram showing an example of a main structure of an optical transmission system in which dynamic dispersion compensation is performed using the optical dispersion monitoring apparatus of FIG. 7.

FIG. 7 is a block diagram showing a structure of the optical dispersion monitoring apparatus of the third embodiment. Furthermore, FIG. 8 is a block diagram showing an example of a main structure of the optical transmission system in which dynamic dispersion compensation is performed using the optical dispersion monitoring apparatus of FIG. 7.

In the figures, an optical dispersion monitoring apparatus 2 of the present embodiment, for example, includes the light receiving section 10 converting an input optical signal into an electrical signal to output it, a signal intensity detecting section 40 sampling a part of the signal output from the light receiving section 10, in which a waveform change due to cumulative dispersion appears distinctively, to detect its intensity (power), and the cumulative dispersion information extracting section 30 extracting cumulative dispersion information based on the detection result in the signal intensity detecting section 40. The structures of the light receiving section 10 and the cumulative dispersion information extracting section 30 are the same as those in the first embodiment, and hence the description thereof is omitted here.

The signal intensity detecting section 40 includes, for example, a selector circuit 41, a clock generation circuit 42, a duty adjusting circuit 43 and a low-pass filter 44. The selector circuit 41 receives the voltage signal $V_{IN}$ output from the light receiving section 10 at an input terminal thereof, and performs a switching operation in accordance with a clock signal CLK output from the duty adjusting circuit 43, to take a part out of the voltage signal $V_{IN}$ at the center of one cycle and the locations neighboring the center, to output it to the low-pass filter 44.

The clock generation circuit 42 generates a clock signal synchronized with a data frequency of the optical signal input to the optical dispersion monitoring apparatus 2. As a specific example of this clock generation circuit 42, a circuit extracting a clock signal component from an electrical or optical data signal can be adopted. Furthermore, in the case where the present optical dispersion monitor 2 is disposed in a regenerative repeater, a clock signal obtained from a data clock regeneration circuit can also be utilized without change.

The duty adjusting circuit 43 adjusts a duty of the clock signal output from the clock generation circuit 42, to supply it to a control terminal of the selector circuit 41. The low-pass filter 44 averages the voltage signal sampled by the selector circuit 41 in accordance with a preset time constant. A voltage signal $V_P$ transmitted through this low-pass filter 44 is supplied to the one input terminal of the comparator 31 in the cumulative dispersion information extracting section 30.

The optical signal input to the optical dispersion monitoring apparatus 1 may be not only the NRZ optical signal or the like, which has the crossing points existing in the eye pattern drawn by folding back a time waveform of the optical signal in one cycle, but also an RZ signal or the like, which has no crossing points, in other words, an optical signal of code type in which there is the signal level transition during one bit cycle.

Figure 9:
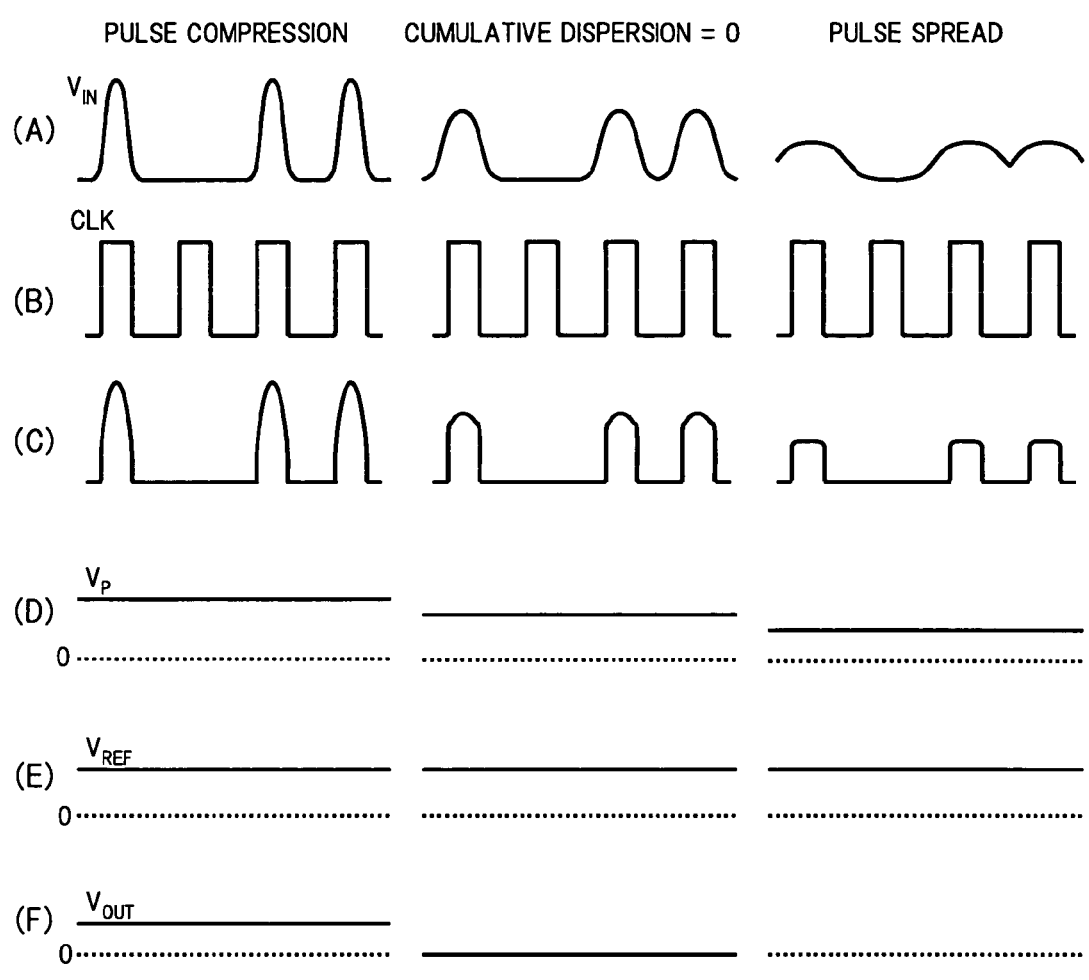
FIG. 9 is a diagram for explaining an operation of the third embodiment.

In the optical dispersion monitoring apparatus 2 with the above construction, a monitor light branched by the optical coupler 6 disposed on the transmission path 3 of the optical transmission system (FIG. 8) is sent to the light receiving section 10, and converted into the voltage signal $V_{IN}$, to be supplied to the signal intensity detecting section 40. Here, assuming the case where an optical signal of RZ type is repeatedly transmitted in the system, the waveform distortion occurs in the waveform of the voltage signal $V_{IN}$ input to the signal intensity detecting section 40 depending on the cumulative dispersion as shown in (A) of FIG. 9 for example. The waveform shown on the left side in (A) of FIG. 9 is an example of when the pulse is compressed, the waveform in the center is an example of when no distortion occurs (cumulative dispersion=0), and the waveform on the right side is an example of when the pulse is spread.

In the signal intensity detecting section 40, the voltage signal $V_{IN}$ output from the light receiving section 10 is input to the selector circuit 41. The clock signal CLK as shown in (B) of FIG. 9 is supplied to this selector circuit 41 from the clock generation circuit 42 via the duty adjusting circuit 43, and a connection state between input and output terminals of the selector circuit 41 is switched in synchronization with the clock signal CLK. Here, when the clock signal CLK is at the high level, the signal input to the input terminal is output from the output terminal. By such a switching operation of the selector circuit 41, a part of the signal at the center of one cycle and the locations neighboring regions of the center is taken out, and the sampled signal is output to the low-pass filter 44. The signal sampled in the selector circuit 41 is averaged in the low-pass filter 44 according to a required time constant. As a result, the voltage signal $V_P$ indicating the average intensity as shown in (D) of FIG. 9 is generated to be output to the cumulative dispersion information extracting section 30.

It is effective to adjust, by the duty adjusting circuit 43, the duty of the clock signal CLK generated in the clock generation circuit 42 to be supplied to the selector circuit 41 for signal sampling, so as to reduce a period of time when the input and output terminals of the selector circuit 41 are in a closed circuit condition. That is to say, by taking a part out of the signal with narrower width at the center of one cycle and the locations neighboring the center for sampling, there is caused a significant difference in the voltage level output from the low-pass filter 44 even if there is a small difference in cumulative dispersion, hence it becomes possible to achieve an improvement in the accuracy of monitoring cumulative dispersion in the latter staged cumulative dispersion information extracting section 30.

Furthermore, similarly to the aforementioned case, it is also effective to have the influence of level change due to the input of the header part masked with the level of when other data part is input, by increasing the time constant of the low-pass filter 34 for example, considering the change in the mark ratio of the input optical signal.

In the cumulative dispersion information extracting section 30, the voltage signal $V_P$ output from the signal intensity detecting section 40 is supplied to the one input terminal of the comparator 31, and similarly to the first embodiment, the level of the voltage signal $V_P$ is compared with the level of the reference signal $V_{REF}$, and the voltage signal $V_{OUT}$ corresponding to the comparison result is output to outside as the cumulative dispersion information. However here, regarding the reference signal $V_{REF}$ supplied to the comparator 31, the fixed voltage level is preset depending on the mark ratio of the optical signal input to the optical dispersion monitoring apparatus 2, and the duty of the clock signal supplied to the selector circuit 41. (E) of FIG. 9 shows an example in which the average voltage level for when the cumulative dispersion is 0 and the reference signal $V_{REF}$ are set to be almost identical, as specific setting of the reference signal $V_{REF}$. By supplying the reference signal $V_{REF}$ set in this manner to the comparator 31, the voltage level of the voltage signal $V_{OUT}$ output from the comparator 31 corresponds to the cumulative dispersion as shown in (F) of FIG. 9. To be specific, in the example of (F) of FIG. 9, a positive value voltage signal $V_{OUT}$ is output as the cumulative dispersion information when the pulse is compressed, and a negative value voltage signal $V_{OUT}$ is output as the cumulative dispersion information when the pulse is spread.

According to the optical dispersion monitoring apparatus 2 of the third embodiment as described above, the part of the input optical signal at the center of one cycle and the locations neighboring the center is sampled to detect the average intensity, and the cumulative dispersion information is extracted based on the detection result. Thus, only the part of the input signal, where the waveform change due to the cumulative dispersion appears most distinctively during one cycle, is utilized for detecting the cumulative dispersion. Therefore, it is possible to detect the cumulative dispersion including the sign information with high accuracy. Furthermore, similarly to the effect in the case of the first embodiment, since the present optical dispersion monitoring apparatus 2 according to the present embodiment differs from the conventional monitoring system in which the error rate is measured, it is possible to reduce restrictions to the installation location in the optical transmission system. If the variable dispersion compensator 5 disposed in the optical transmission system is feedback controlled using such an optical dispersion monitoring apparatus 2, it becomes possible to perform dynamic compensation for the cumulative dispersion occurring in the system easily and reliably.

Next is a description of an optical dispersion monitoring apparatus according to a fourth embodiment of the present invention.

Figure 10:
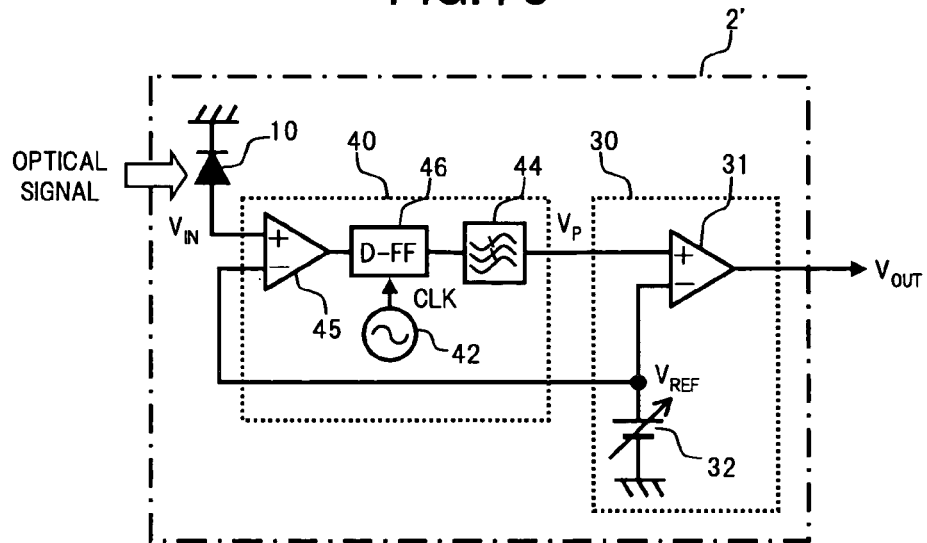
FIG. 10 is a block diagram showing a structure of an optical dispersion monitoring apparatus according to a fourth embodiment of the present invention.

FIG. 10 is a block diagram showing a structure of the optical dispersion monitoring apparatus of the fourth embodiment.

In FIG. 10, the structure of the present optical dispersion monitoring apparatus 2' is different from the structure in the third embodiment shown in FIG. 7 in that a comparator 45 and a sample and hold circuit 46 are disposed in the signal intensity detecting section 40, instead of the selector circuit 41 and the duty adjusting circuit 43. Other structures than the above, namely, the clock generation circuit 42, the low-pass filter 44, the light receiving section 10 and the cumulative dispersion information extracting section 30, are the same as those in the third embodiment, and hence the descriptions thereof are omitted here.

The comparator 45 receives the voltage signal $V_{IN}$ output from the light receiving section 10 at one input terminal thereof and the reference signal $V_{REF}$ generated in the reference signal generating circuit 32 in the cumulative dispersion information extracting section 30 at the other input terminal, and compares the level of the voltage signal $V_{IN}$ with the level of the reference signal $V_{REF}$, to output a voltage signal corresponding to the comparison result to the sample and hold circuit 46. A typical analog comparator may be used for this comparator 45. The sample and hold circuit 46 samples the signal output from the comparator 45 in synchronization with the clock signal CLK from the clock generation circuit 42, to output it to the low-pass filter 44. As a specific example of this sample and hold circuit 46, a delay flip-flop (D-FF) circuit or the like may be used.

In the optical dispersion monitoring apparatus 2' with the above construction, the voltage signal $V_{IN}$ converted photoelectrically in the light receiving section 10 is supplied to the comparator 45 in the signal intensity detecting section 40. Here, assuming a case where an optical signal of NRZ type is repeatedly transmitted in the system, the level of the voltage signal $V_{IN}$ input to the comparator 4 is changed depending on the cumulative dispersion as shown in (A) of FIG. 11.

Figure 11:
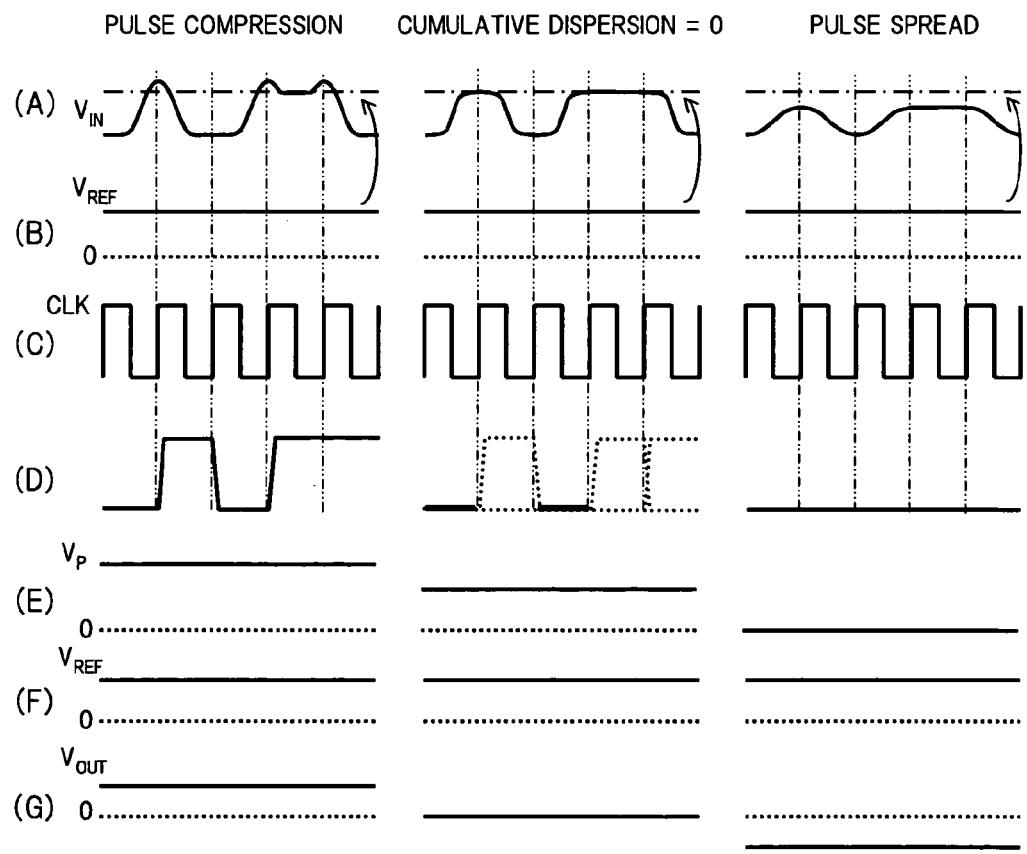
FIG. 11 is a diagram for explaining an operation of the fourth embodiment.

The comparator 45 compares the level of the voltage signal $V_{IN}$ from the light receiving section 10 with the reference signal $V_{REF}$ as shown in (B) of FIG. 11, to output the voltage signal corresponding to the comparison result to the sample and hold circuit 46. The sample and hold circuit 46 samples the voltage signal from the comparator 45 in accordance with the clock signal CLK as shown in (C) of FIG. 11 in synchronization with the data frequency of input signal. To be specific, as shown in (D) of FIG. 11, the sample and hold circuit 46 samples the voltage signal from the comparator 45 at the time of rising edge of the clock signal CLK, and thereafter, holds the level of the voltage signal until the time of next rising edge. As a result, the level of the signal output from the sample and hold circuit 46 is changed differently depending on the state of waveform distortion. In (D) of FIG. 11, a portion of the output level of the sample and hold circuit 46 shown by dotted lines when the cumulative dispersion=0 indicates a possibility in that the level of the voltage signal $V_{IN}$ reaches the reference signal $V_{REF}$, and hence the output level becomes unstable due to an influence of noise and the like.

The output signal from the sample and hold circuit 46 is sent to the low-pass filter 44, to be smoothed in accordance with a required time constant. As a result, a voltage signal $V_P$ indicating averaged intensity as shown in (E) of FIG. 11 is generated to be output to the cumulative dispersion information extracting section 30. In the cumulative dispersion information extracting section 30, similarly to the third embodiment, the voltage signal $V_P$ output from the signal intensity detecting section 40 is supplied to the one input terminal of the comparator 31, the level of the voltage signal $V_P$ is compared with the level of the reference signal $V_{REF}$ as shown in (F) of FIG. 11, and a voltage signal $V_{OUT}$ corresponding to the comparison result is output to outside as the cumulative dispersion information. The voltage level of this voltage signal $V_{OUT}$ corresponds to the cumulative dispersion as shown in (G) of FIG. 11. To be specific, in one example of (G) of FIG. 11, a positive value voltage signal $V_{OUT}$ is output as the cumulative dispersion information when the pulse is compressed, and a negative value voltage signal $V_{OUT}$ is output as the cumulative dispersion information when the pulse is spread.

According to the optical dispersion monitoring apparatus 2' of the fourth embodiment as described above, it is possible to achieve the same effect as in the third embodiment, by performing sampling of signal using the comparator 45 and the sample and hold circuit 46.

In the above third and fourth embodiments, the structure is such that the fixed reference signal $V_{REF}$ is supplied to the comparator 31 in the cumulative dispersion information extracting section 30. However, similarly to the second embodiment shown in FIG. 6, the structure may also be adopted in which the reference signal $V_{REF}$ that follows the change in the input signal is supplied to the comparator 31.

Next is a description of an optical dispersion monitoring apparatus according to a fifth embodiment of the present invention. Here, the description will be made on an improved example of the optical dispersion monitoring apparatus in the fourth embodiment, wherein stability of operation is achieved.

Figure 12:
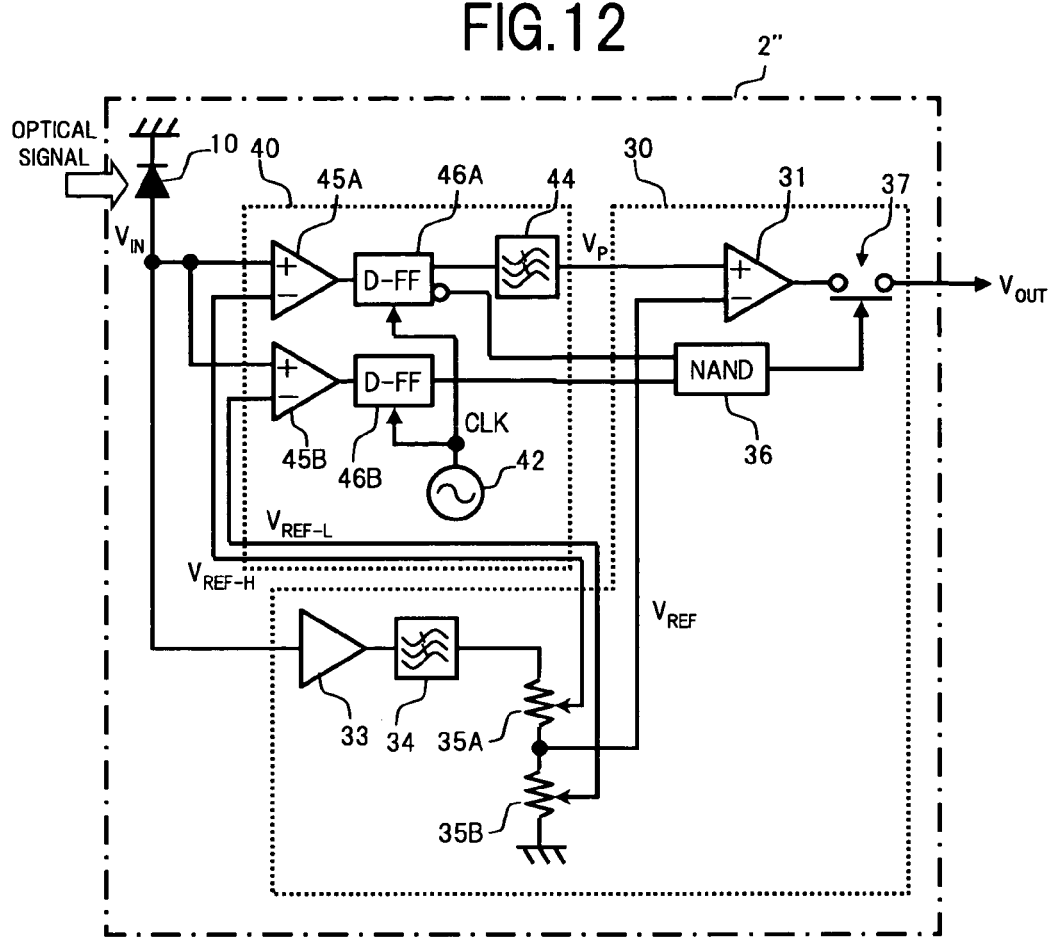
FIG. 12 is a block diagram showing a structure of an optical dispersion monitoring apparatus according to a fifth embodiment of the present invention.

FIG. 12 is a block diagram showing a structure of the optical dispersion monitoring apparatus of the fifth embodiment.

In FIG. 12, the optical dispersion monitoring apparatus 2" of the present embodiment includes a comparator 45A and a sample and hold circuit 46A disposed in parallel with each other, and a comparator 45B and a sample and hold circuit 46B disposed in parallel with each other, in the signal intensity detecting section 40. Furthermore, similarly to the second embodiment described above, in order to generate a reference signal $V_{REF}$ that follows the change in the input signal, the gain control amplifier 33 and the low-pass filter 34, and potentiometers 35A and 35B, are disposed in the cumulative dispersion information extracting section 30, and also a NAND circuit 36 and a switch circuit 37 are disposed to disconnect a monitor, to stabilize an operation as described later. The structures other than the above are the same as those in the fourth embodiment.

The comparators 45A and 45B, and the sample and hold circuits 46A and 46B are the same as the comparator 45 and the sample and hold circuit 46 used in the fourth embodiment. Here, each of the comparators 45A and 45B receives the voltage signal $V_{IN}$ output from the light receiving section 10 at one input terminal thereof. Furthermore, a voltage from a sliding terminal of the potentiometer 35A is applied to the other input terminal of the comparator 45A as a high level side reference signal $V_{REF-H}$, and a voltage from a sliding terminal of the potentiometer 35B is applied to the other input terminal of the comparator 45B as a low level side reference signal $V_{REF-L}$. The comparator 45A compares the level of the voltage signal $V_{IN}$ with the level of the reference signal $V_{REF-H}$ and the comparator 45B compares the level of the voltage signal $V_{IN}$ with the level of the reference signal $V_{REF-L}$. Then, the comparators 45A and 45B output voltage signals indicating the comparison results to data input terminals of the sample and hold circuits 46A and 46B, respectively.

The sample and hold circuits 46A and 46B sample the signals output from the comparators 45A and 45B in synchronization with the clock signal CLK from the clock generation circuit 42. The sample and hold circuit 46A outputs the sampled signal to the low-pass filter 44, and outputs an inversion signal of the sampled signal to the NAND circuit 36 in the cumulative dispersion information extracting section 30. Furthermore, the sample and hold circuit 46B outputs the sampled signal to the NAND circuit 36 in the cumulative dispersion information extracting section 30.

The gain control amplifier 33 and the low-pass filter 34 disposed in the cumulative dispersion information extracting section 30 are the same as those used in the second embodiment. The potentiometers 35A and 35B are variable resistors each having three terminals, and are connected in series between an output terminal of the low-pass filter 34 and the ground terminal. A voltage at the common connection node of the potentiometers 35A and 35B is supplied to the comparator 31 as the reference signal $V_{REF}$ for detecting the cumulative dispersion based on the voltage signal $V_P$ output from the signal intensity detecting section 40.

The NAND circuit 36 calculates the NAND of the inverse sampled signal output from the sample and hold circuit 46A and the sampled signal output from the sample and hold circuit 46B, to output the calculated result to the switching circuit 37. The switching circuit 37 is disposed at an output stage of the comparator 31, to perform a switching operation according to the output signal from the NAND circuit 36.

In the optical dispersion monitoring apparatus 2″ with the above construction, as described in the description of the state (state after sampling) of (D) of FIG. 11 in the fourth embodiment, it is considered that in the case where the cumulative dispersion is approximately 0, the levels of the voltage signal $V_{IN}$ and the reference signal $V_{REF}$ to be compared with each other by the comparator 45 in the signal intensity detecting section 40 are the same, and hence the signal level after sampling becomes unstable. Therefore, if such a state occurs, the signal $V_{OUT}$ indicating the monitored result of the cumulative dispersion is not output to outside.

Figure 13:
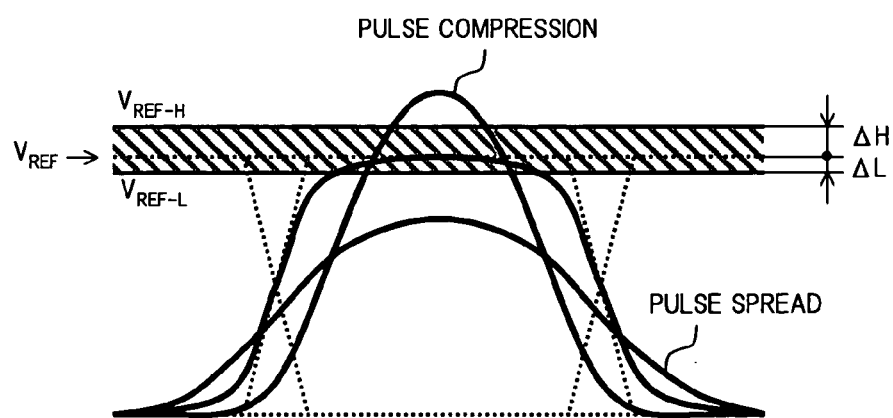
FIG. 13 is a diagram showing an example of setting a reference signal in the fifth embodiment.

To be specific, in the fourth embodiment, signal sampling is performed based on one reference signal $V_{REF}$ in the signal intensity detecting section 40, whereas in the present embodiment, as shown in FIG. 13 for example, the reference signal $V_{REF-H}$ whose level is ΔH higher than the reference signal $V_{REF}$ and the reference signal $V_{REF-L}$ whose level is ΔL lower than the reference signal $V_{REF}$ are obtained using the potentiometers 35A and 35B, and signal sampling is performed based on both of the reference signals $V_{REF-H}$ and $V_{REF-L}$. As a result, when the level of the voltage signal $V_{IN}$ input to each of the comparators 45A and 45B is between $V_{REF-L}$ and $V_{REF-H}$ (shaded portion in FIG. 13), the signal sampled by the sample and hold circuit 46A is at the low level, and the signal sampled by the sample and hold circuit 46B is at the high level.

Accordingly, in the above case, the voltage signals sent from the sample and hold circuits 46A and 46B to the NAND circuit 36 are both at high levels, and the low level signal is output from the NAND circuit 36 to the switching circuit 37, so that the switching circuit 37 becomes open circuit. As a result, in a condition where the voltage signal $V_{IN}$ is in the vicinity of $V_{REF}$ (the cumulative dispersion is about 0), and hence the operation is unstable, the cumulative dispersion information output from the comparator 31 is prevented from being sent to outside. On the other hand, in cases other than the above, since the output signal from the NAND circuit 36 is at the high level, the switching circuit 37 becomes closed circuit, and hence the cumulative dispersion information is sent to outside.

According to the optical dispersion monitoring apparatus 2″ of the fifth embodiment as described above, since the monitored result obtained when a monitoring state of cumulative dispersion becomes unstable due to the influence of noise and the like, is not output to outside, it becomes possible to stabilize the monitoring operation. If the variable dispersion compensator 5 disposed in the optical transmission system as shown in FIG. 8 is feedback controlled using such an optical dispersion monitoring apparatus 2″, the optical dispersion monitoring apparatus 2″ is disconnected depending on the state of cumulative dispersion compensation, and hence it becomes possible to prevent noise and the like from being propagated from the monitoring system. Therefore, it becomes possible to perform dynamic compensation for the cumulative dispersion occurred in the system reliably.

Figure 14:
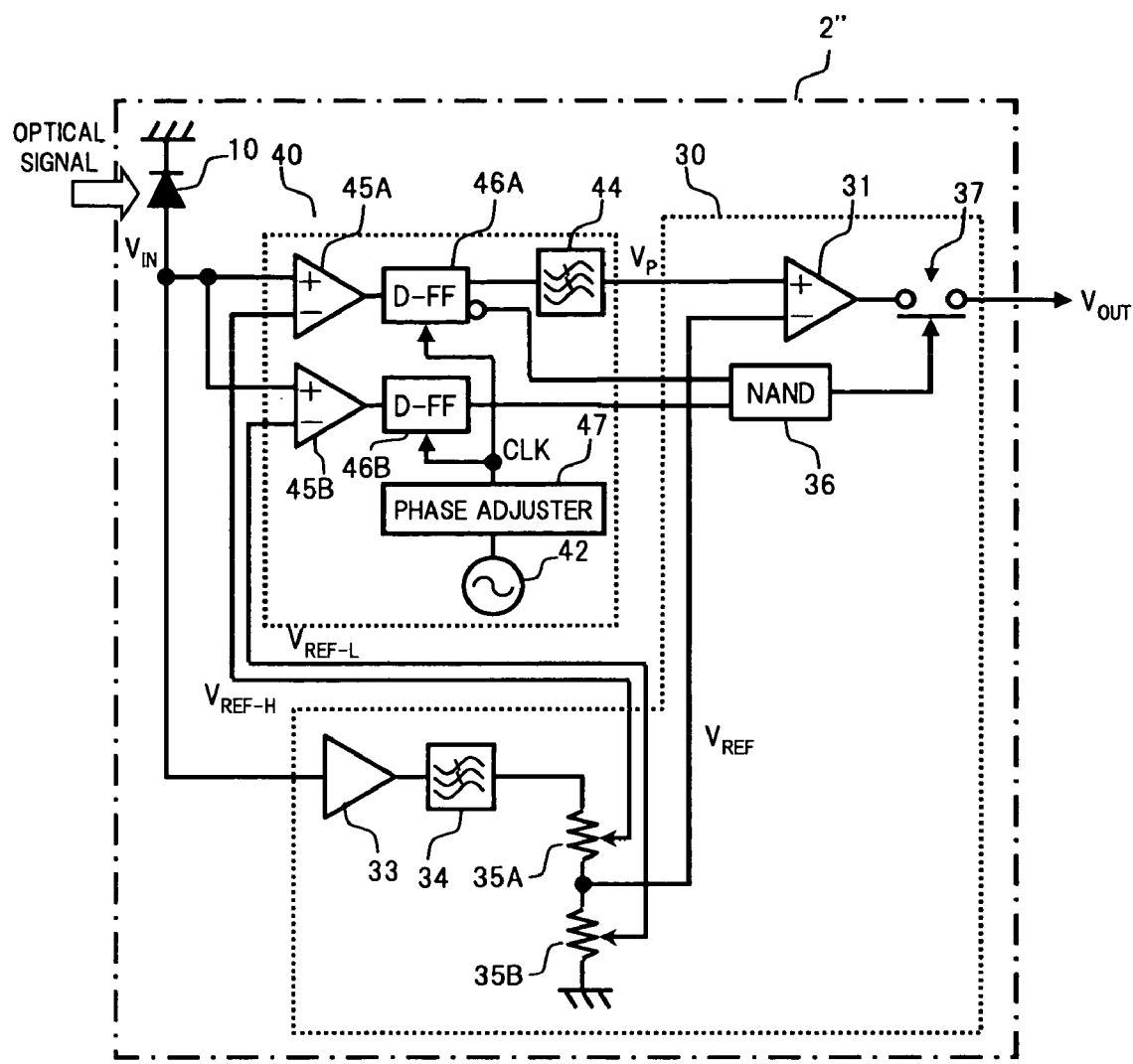
FIG. 14 is a block diagram showing a constitutional example in which a phase of a clock signal is made adjustable, in relation to the fifth embodiment.

In the third to fifth embodiments, the input optical signal at the center of one cycle and the locations neighboring the center is sampled. However, for example, if the location where the waveform change due to the cumulative dispersion appears distinctively is shifted from the center of one cycle, it is also possible that a phase of the clock signal CLK supplied to the selector circuit 41 and the sample and hold circuit 46 is adjusted using a phase adjuster or the like, to be shifted from the center of the cycle for optimization. To be specific, FIG. 14 shows an example of the case where a phase adjuster 47 is disposed in the optical dispersion monitoring apparatus 2″ of the fifth embodiment.

Figure 15:
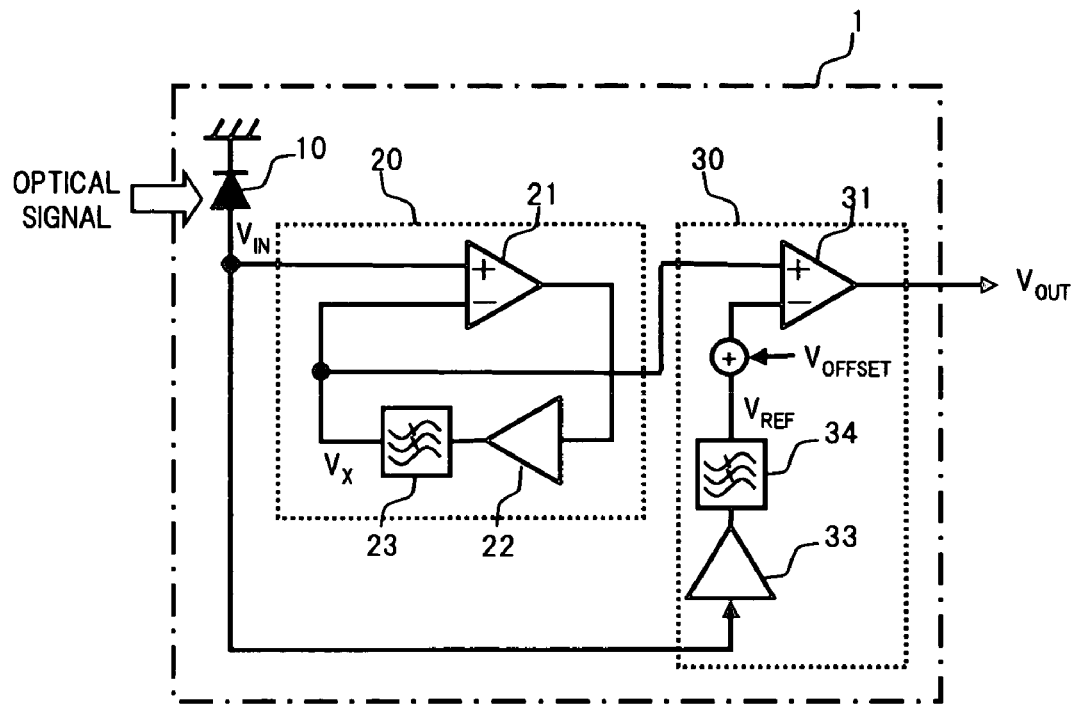
FIG. 15 is a block diagram showing a constitutional example in which there is provided a function for adding an offset signal to a reference signal, in relation to the above embodiments.

Furthermore, in the first to fifth embodiments, the level of the reference signal $V_{REF}$, being a reference for when the cumulative dispersion is detected in the cumulative dispersion information extracting section 30, is set to be approximately coincident with the voltage level of when the cumulative dispersion is 0. However, for example, considering the dispersion characteristics of the transmission path and the like on the latter stages of the position where the optical dispersion monitoring apparatus is disposed in the optical transmission system, identification characteristics of an optical receiving apparatus, and the like, then in the case where the dispersion compensation is performed intentionally so as to occur the required cumulative dispersion, without setting the monitor reference in the optical dispersion monitoring apparatus for cumulative dispersion=0, it is possible to respond to such a case by providing a function for adding an offset signal $V_{OFFSET}$ to $V_{REF}$ set corresponding to cumulative dispersion=0, as shown in FIG. 15. FIG. 15 shows a constitutional example corresponding to the optical dispersion monitoring apparatus 1 of the first embodiment, but such a function is also applicable to the other embodiments.

Figure 16:
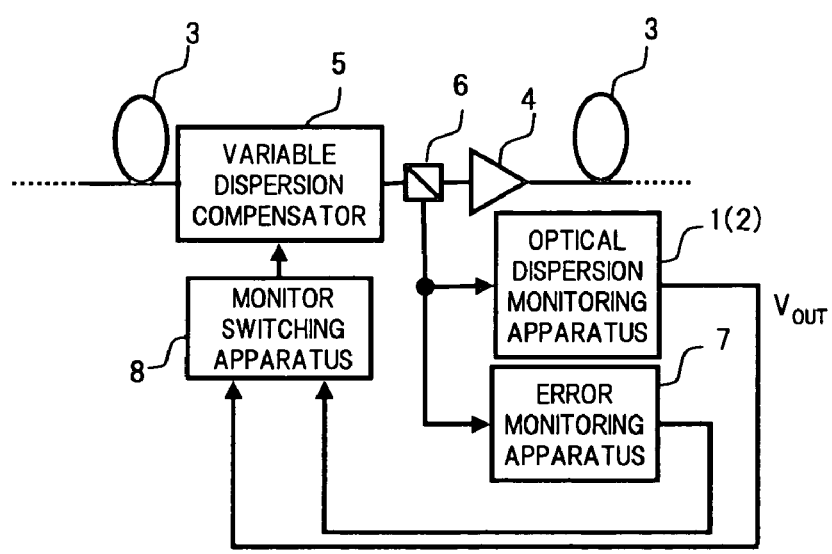
FIG. 16 is a block diagram showing an example of main structure of an optical transmission system, in which an optical dispersion monitoring apparatus and an error monitoring apparatus are used together, in relation to the embodiments.

Moreover, in the first to fifth embodiments, as shown in FIG. 2 and FIG. 8, the example is described in which the variable dispersion compensator 5 in the optical transmission system is feedback controlled based on the cumulative dispersion information output from the optical dispersion monitoring apparatus. However, as shown in FIG. 16 for example, the construction may be such that the optical dispersion monitoring apparatus in each embodiment and a known error monitoring apparatus 7 are used together, to feedback control the variable dispersion compensator 5, while switching the monitored results of each monitoring apparatus using a monitor switching apparatus 8. This type of construction is effective in the following condition. Namely, when the system is powered up, or in the case where the variation in the dispersion characteristics is significantly large, a condition is assumed in which the waveform distortion is so high that the optical dispersion monitoring apparatus of the present invention cannot operate normally. In such a condition, it is effective to feedback control the variable dispersion compensator 5 using the monitored result of the error monitoring apparatus 7 having a wide operating range for coarse control, and the monitored result of the optical dispersion monitoring apparatus of the present invention for fine control.

What is claimed is:

1. An optical dispersion monitoring apparatus for monitoring dispersion based on a waveform of an input optical signal, comprising:
    a characteristic amount detecting section selectively detecting a physical amount corresponding to a location where waveform distortion occurring depending on dispersion appears distinctively in the waveform of said input optical signal; and
    a dispersion information extracting section extracting information related to the dispersion which has occurred in said optical signal, based on a comparison between the physical amount detected in said characteristic amount detecting section and a reference value indicated by a reference signal, to output the information,
    wherein said characteristic amount detecting section includes:
        a light receiving section converting said input optical signal into an electrical signal; and
        a signal transition position detecting section detecting the voltage level corresponding to at least one of a rising edge and a falling edge of a waveform of the electrical signal converted in said light receiving section, and
    wherein said dispersion information extracting section compares the reference value indicated by the reference signal with the voltage level detected in said signal transition position detecting section, and outputs a signal corresponding to the comparison result as dispersion information; and
    wherein said signal transition position detecting section detects the voltage level corresponding to crossing points in an eye pattern of the electrical signal converted in said light receiving section.

2. An optical dispersion monitoring apparatus according to claim 1,
    wherein said signal transition position detecting section includes:
        a comparator which receives the electrical signal converted in said light receiving section at one input terminal thereof;
        a slice amplifier which amplifies a signal output from said comparator; and
        a low-pass filter which smoothes a signal output from said slice amplifier to provide feedback to the other input terminal of said comparator, and the signal transmitted through said low-pass filter is supplied to said dispersion information extracting section as the voltage level corresponding to said crossing points.

3. An optical dispersion monitoring apparatus according to claim 1,
    wherein said dispersion information extracting section sets said reference signal depending on a mark ratio of said input optical signal.

4. An optical dispersion monitoring apparatus according to claim 3,
    wherein said dispersion information extracting section sets said reference signal so as to follow a change in power setting of said input optical signal.

5. An optical dispersion monitoring apparatus according to claim 3,
    wherein said dispersion information extracting section sets said reference signal so as to be approximately coincident with the physical amount detected in said characteristic amount detecting section when the dispersion is zero.

6. An optical dispersion monitoring apparatus according to claim 5,
    wherein said dispersion information extracting section comprises a circuit which adds an offset signal to said reference signal.

7. An optical transmission system provided with a variable dispersion compensator on a transmission path through which an optical signal is propagated, for controlling a compensation amount of said variable dispersion compensator to dynamically compensate for dispersion, wherein
    using the optical dispersion monitoring apparatus in claim 1, dispersion which has occurred in the optical signal being propagated through said transmission path is monitored and the compensation amount of said variable dispersion compensator is controlled in accordance with said monitored result.

8. An optical transmission system according to claim 7, further comprising:
    an error monitoring apparatus for measuring an error rate of the optical signal propagated through said transmission path; and
    a monitor switching apparatus for selectively switching respective monitored results of said optical dispersion monitoring apparatus and said error monitoring apparatus,
    wherein the compensation amount of said variable dispersion compensator is controlled in accordance with the monitored result selected by said monitor switching apparatus.

9. A method of monitoring optical dispersion for monitoring dispersion based on a waveform of an input optical signal, comprising:
    selectively detecting a physical amount corresponding to a location where waveform distortion occurring depending on dispersion appears distinctively in the waveform of said input optical signal; and
    extracting information related to the dispersion occurring in said optical signal, based on a comparison between said detected physical amount and a reference value indicated by a reference signal, wherein said selectively detecting comprises detecting a voltage level corresponding to crossing points in an eye pattern of an electrical signal corresponding to the input optical signal.

10. An optical dispersion monitoring apparatus monitoring dispersion based on a waveform of an input optical signal, comprising:

a characteristic amount detecting section selectively detecting a physical amount corresponding to a location where waveform distortion occurring depending on dispersion appears distinctively in the waveform of said input optical signal; and a dispersion information extracting section extracting information related to the dispersion which has occurred in said input optical signal, based on a comparison between the physical amount detected in said characteristic amount detecting section and a reference value indicated by a reference signal, to output the information, wherein said dispersion information extracting section sets said reference signal depending on a mark ratio of said input optical signal, and wherein said characteristic amount detecting section detects a voltage level corresponding to crossing points in an eye pattern of an electrical signal corresponding to said input optical signal.

11. An optical dispersion monitoring apparatus monitoring dispersion based on a waveform of an input optical signal, comprising:

a characteristic amount detecting section including:

a light receiving section converting the input optical signal into an electrical signal; and a signal transition position detecting section detecting a voltage level corresponding to at least one of a rising edge and a falling edge of a waveform of the electrical signal; and a dispersion information extracting section extracting information related to the dispersion which has occurred in the optical signal by comparing a reference value indicated by a reference signal with the voltage level detected in said signal transition position detecting section, and outputting a signal corresponding to the comparison result as dispersion; and wherein said signal transition position detecting section detects the voltage level corresponding to crossing points in an eye pattern of the electrical signal converted in said light receiving section.

* * * * *

UNITED STATES PATENT AND TRADEMARK OFFICE
CERTIFICATE OF CORRECTION

| | |
|---|---|
| PATENT NO. | : 7,324,758 B2 |
| APPLICATION NO. | : 10/716411 |
| DATED | : January 29, 2008 |
| INVENTOR(S) | : Masazumi Marutani et al. |

It is certified that error appears in the above-identified patent and that said Letters Patent is hereby corrected as shown below:

On the Title Page, Item (57) (Abstract), Line 12, change "extracts" to --extract--.

Column 20, Line 17, change "dispersion;" to --dispersion information;--.

Signed and Sealed this

Eighth Day of July, 2008

JON W. DUDAS
*Director of the United States Patent and Trademark Office*